United States Patent
Spark et al.

(10) Patent No.: US 6,775,921 B2
(45) Date of Patent: Aug. 17, 2004

(54) METHOD FOR FABRICATING AN ANNULAR SCALE

(75) Inventors: Dieter Spark, Trostberg (DE); Kurt Feichtinger, Palling (DE)

(73) Assignee: Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 10/389,088

(22) Filed: Mar. 14, 2003

(65) Prior Publication Data

US 2003/0173119 A1 Sep. 18, 2003

(30) Foreign Application Priority Data

Mar. 14, 2002 (DE) .......................................... 102 11 155

(51) Int. Cl.[7] .................................................. G01B 5/00
(52) U.S. Cl. .............................. 33/706; 33/707; 33/755; 33/555.1; 33/555.4; 29/DIG. 48; 29/DIG. 1; 156/60; 156/64
(58) Field of Search .......................... 33/755, 758, 1 N, 33/1 PT, 706, 707, 708, 759, 760, 555.1, 555.4; 29/DIG. 48, DIG. 1; 156/64

(56) References Cited

U.S. PATENT DOCUMENTS

| | | | | | |
|---|---|---|---|---|---|
| 4,061,517 | A | * | 12/1977 | Dutton et al. ................ | 156/212 |
| 4,149,320 | A | * | 4/1979 | Troyer et al. ................. | 33/758 |
| 4,922,622 | A | * | 5/1990 | Galloway .................. | 33/555.4 |
| 5,401,335 | A | | 3/1995 | Grell | |
| 5,529,489 | A | * | 6/1996 | Herrera ...................... | 33/555.4 |
| 5,799,407 | A | * | 9/1998 | Powell ....................... | 33/555.4 |
| 5,895,535 | A | * | 4/1999 | Bentz .......................... | 156/64 |
| 5,979,238 | A | * | 11/1999 | Boege et al. ................. | 33/755 |
| 6,564,468 | B2 | * | 5/2003 | Blattner et al. ............... | 33/706 |
| 6,678,967 | B1 | * | 1/2004 | Jueneman ..................... | 33/758 |

FOREIGN PATENT DOCUMENTS

| | | |
|---|---|---|
| DE | 87 17 505 | 10/1988 |
| DE | 43 32 854 | 9/1993 |

* cited by examiner

*Primary Examiner*—Christopher W. Fulton
*Assistant Examiner*—Amanda J Hoolahan
(74) *Attorney, Agent, or Firm*—Kenyon & Kenyon

(57) ABSTRACT

In a method for manufacturing an annular scale from a measuring strip, the ends of a measuring strip are welded together, and the shortening of the scale-division marks in the joint region caused by the welding operation is compensated by a subsequent rolling operation.

9 Claims, 2 Drawing Sheets

METHOD FOR FABRICATING AN ANNULAR SCALE

CROSS-REFERENCE TO RELATED APPLICATIONS

The present application claims priority to Application No. 102 11 155.3, filed in the Federal Republic of Germany on Mar. 14, 2002, which is expressly incorporated herein in its entirety by reference thereto.

1. Field of the Invention

The present invention relates to a method for fabricating an annular scale, as well as to a scale manufactured in accordance with this method.

2. Background Information

To manufacture an annular scale, it is described in German Published Utility Model No. 87 17 505 and German Published Patent Application No. 43 32 854 to bend a measuring strip having scale-division marks into a closed ring and to weld together its two ends. An annular scale fabricated in this manner is joined by press-on action to a cylindrical support part.

For precise positional measurements, the scale-division marks are required to have a constant setpoint length over the entire circumference of the scale. This cannot be achieved or can only be achieved with substantial outlay in accordance with conventional methods.

SUMMARY

It is an object of the present invention, therefore, to provide a method which may make it possible to produce an annular measuring strip, which may facilitate precise positional measurements.

The above and other beneficial objects of the present invention are achieved by providing a method and an annular scale as described herein.

According to an example embodiment of a method of the present invention, the method for fabricating an annular scale having a scale-division track including a series of scale-division marks of a predefined setpoint length for purposes of position measuring includes joining two ends of a measuring strip bearing the scale-division marks, welding together the two ends of the measuring strip, and lengthening at least one of the scale-division marks in a welded joint region to the predefined setpoint length.

According to an example embodiment of an annular scale of the present invention, the annular scale includes a scale-division track including a series of scale-division marks of a predefined setpoint length arranged for position measurement, the annular scaled fabricated according to a method including joining two ends of a measuring strip bearing the scale-division marks, welding together the two ends of the measuring strip, and lengthening at least one of the scale-division marks in a welded joint region to the predefined setpoint length.

Details pertaining to the method of the present invention, as well as to the scale fabricated using the method, are derived from the following description of an exemplary embodiment, on the basis of the figures.

DETAILED DESCRIPTION

Figure 1:
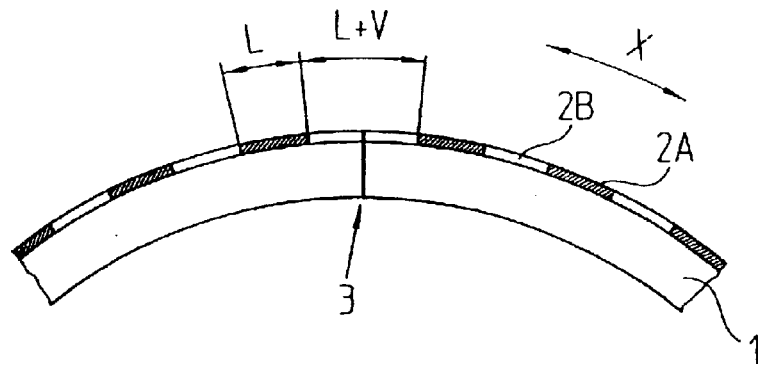
FIG. 1 is a top view of a detail of the scale following the method step of jointing.
Figure 2:
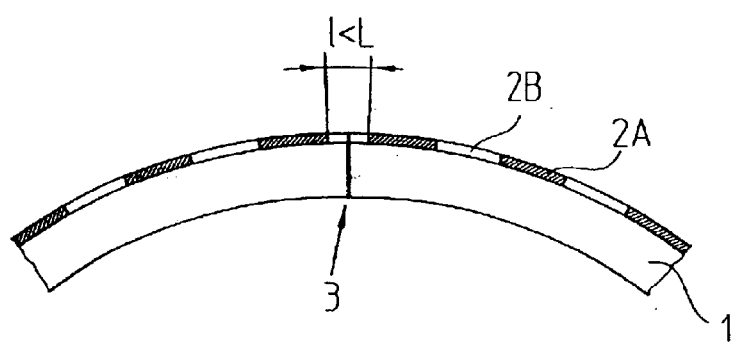
FIG. 2 is a detail view in accordance with FIG. 1, following the method step of welding.
Figure 3:
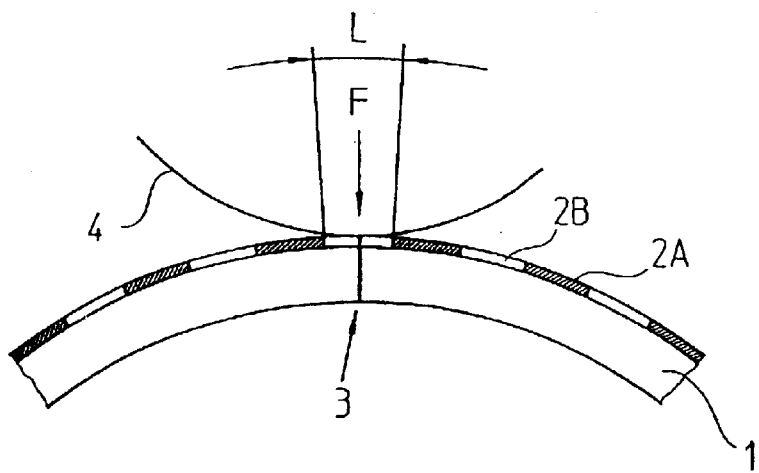
FIG. 3 is a detail view in accordance with FIG. 1, following the method step of rolling.

FIGS. 1 through 3 each schematically illustrate a detail of a measuring strip 1, bent to form a closed ring, in accordance with the individual method steps. The base material is a flexible metal measuring strip 1, which, in the longitudinal direction, has scale-division marks 2 in the form of an incremental scale graduation. Measuring strip 1 may be a longitudinally stable steel strip having reflective scale-division marks 2A, alternately placed in longitudinal direction X, in the form of a gold or chromium coating, and non-reflective scale-division marks 2B of the same length L, which are able to be photoelectrically scanned for purposes of position measuring.

Measuring strip 1 is cut to the required length, and the two ends are worked such that, following the jointing or pushing together of the two ends, scale-division mark 2 in joint region 3 is greater or equal to length L of scale-division marks 2 in the remaining region, thus greater or equal to setpoint length L for the position measuring.

Tests have shown that it may be beneficial for scale-division mark 2 in joint region 3 to be larger than setpoint length L and, e.g., larger by nearly an amount V, by which this scale-division mark 2 is made smaller during the welding process due to the effect of heat. The measuring strip ends are adapted by fine-machining, e.g., by grinding, and are butt-jointed, so that, in this joint region 3, the length of scale-division mark 2 is (L+V), as illustrated in FIG. 1.

Figure 4:
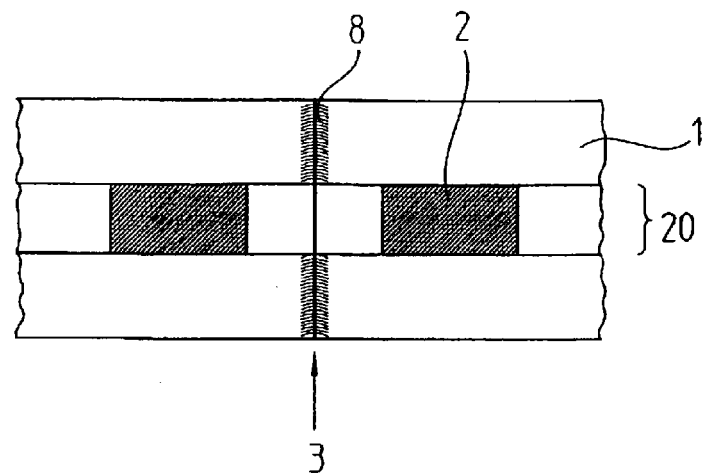
FIG. 4 is a plan view of the joint region of the welded scale.

In this state, the measuring strip ends are welded together. From the plan view in FIG. 4, it is illustrated that, in the context of photoelectrically scannable scale-division marks 2, the welding may be performed only on two sides and outside of scale-division track 20 constituting the series of scale-division marks 2.

During the welding process, scale-division marks 2 become shorter in the region where the heat from the welding process exceeds a material-specific temperature, as illustrated in FIG. 2. This material contraction in joint region 3 produces across one or more graduation intervals 2 length (s) 1 that are smaller than setpoint length L and, in the photoelectric scanning of these scale-division marks 2 for generating electrical, positionally dependent scanning signals, leads to a short signal period and, thus, in the subsequent signal interpolation for high-resolution positional measuring, to measurement errors.

These measurement errors may be prevented or at least reduced in accordance with the present invention by lengthening the shortened scale-division marks 2 to setpoint length L. A practical mechanical lengthening method is material pressing or plastic deformation, transversely to longitudinal direction X of measuring strip 1, by rolling or pressing, as schematically illustrated in FIG. 3. Using a mechanical pressure tool, such as a roll 4, a force F is partially exerted on measuring strip 1. To adjust optimal length L of scale-division marks 2 in and, in some instances, around joint region 3, the processes of rolling and checking the length are alternately performed. As soon as the test, reveals that the measured length of scale-division marks 2 is within a predefined tolerance of setpoint length L, the rolling operation is completed.

Setpoint length L of scale-division mark 2 is, for example, 20 μm, V is about 5 to 15 μm, and the required length correction by pressing, rolling is then, for instance, 2 through 5 μm.

Figure 5:
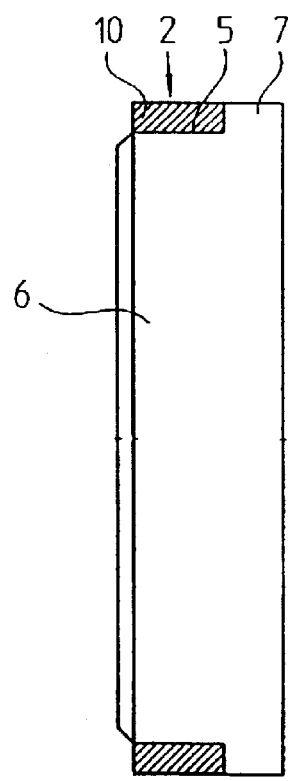
FIG. 5 illustrates the scale on a support part in cross-section.
Figure 6:
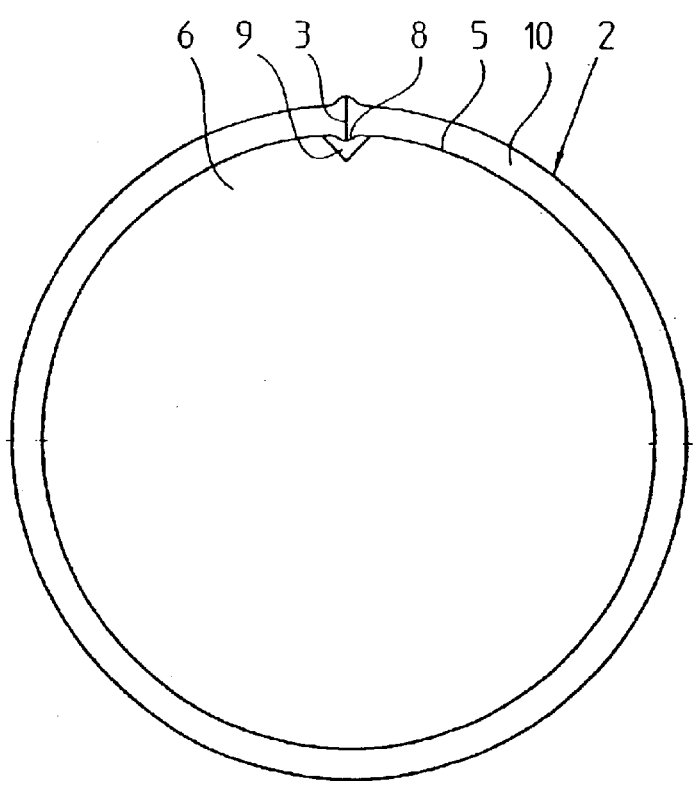
FIG. 6 is a side view of the scale in accordance with FIG. 5.

The thus fabricated annular scale 10 having a specific number of scale-division marks 2 of same length L over the entire circumference, is pressed onto outer surface 5 of a cylinder 6. For optimal seating of scale 10, it may be slid on in the heated state (shrink fit), and/or the press-on action is performed in the state of a cooled cylinder 6 (expansion fit). For precise alignment of annular scale 10, the scale 10 may abut against a ring 7 of cylinder 6, as illustrated in FIG. 5.

During the welding operation, a weld bead 8 or bulge is formed in joint region 3 as the result of material fusion. To accommodate this weld bead 8, an axially extending groove 9 is introduced in cylinder 6.

Cylinder 6, together with pressed-on scale 10, may be manufactured to any desired diameter. This device may ensure a uniformly precise angular measurement over the entire circumference. It is suited, for example, for measuring the rotational position of a spindle of a machine tool, thus for the positionable axis of rotation of a tool spindle.

What is claimed is:

1. A method for fabricating an annular scale having a scale-division track including a series of scale-division marks of a predefined setpoint length for purposes of position measuring, the method comprising:

joining two ends of a measuring strip bearing the scale-division marks;

welding together the two ends of the measuring strip; and lengthening at least one of the scale-division marks in a welded joint region to the predefined setpoint length.

2. The method according to claim 1, wherein the lengthening includes material pressing transversely to a longitudinal direction of the measuring strip.

3. The method according to claim 2, wherein the material pressing includes a rolling operation.

4. The method according to claim 1, wherein the welding is performed exclusively outside of the scale-division track.

5. The method according to claim 1, further comprising selecting the length of the measuring strip prior to the welding such that when the joining and welding the two measuring-strip ends in the joint region, a resultant length of the scale-division mark is increased approximately by a measure of the setpoint length by which the measuring strip is made smaller in the joint region during the welding.

6. The method according to claim 1, further comprising pressing the annular scale onto an outside surface of a cylindrical support.

7. An annular scale, comprising:

a scale-division track including a series of scale-division marks of a predefined setpoint length arranged for position measurement, the annular scaled fabricated according to a method including:

joining two ends of a measuring strip bearing the scale-division marks;

welding together the two ends of the measuring strip; and lengthening at least one of the scale-division marks in a welded joint region to the predefined setpoint length.

8. The annular scale according to claim 7, wherein the welded-together measuring strip is arranged on an outside surface of a cylindrical support and abuts axially against a ring of the support.

9. The annular scale according to claim 7, wherein the welded-together measuring strip is arranged on an outside surface of a cylindrical support, an axially extending groove arranged on the outside surface of the support, a weld bead of the measuring strip arranged in the groove.

* * * * *